(12) United States Patent
Meyer

(10) Patent No.: US 7,092,194 B2
(45) Date of Patent: Aug. 15, 2006

(54) METHOD OF CALIBRATING MAGNETIC STORAGE MEDIUM BI-DIRECTIONAL RECORDING HEAD

(76) Inventor: Dallas W. Meyer, 4130 Sugar Maple Dr., Danville, CA (US) 94506

( * ) Notice: Subject to any disclaimer, the term of this patent is extended or adjusted under 35 U.S.C. 154(b) by 230 days.

(21) Appl. No.: 10/775,406

(22) Filed: Feb. 9, 2004

(65) Prior Publication Data

US 2004/0160693 A1 Aug. 19, 2004

Related U.S. Application Data

(60) Provisional application No. 60/445,963, filed on Feb. 7, 2003.

(51) Int. Cl.
*G11B 5/60* (2006.01)
(52) U.S. Cl. .................................................. 360/75
(58) Field of Classification Search ................... None
See application file for complete search history.

(56) References Cited

U.S. PATENT DOCUMENTS

| | | | |
|---|---|---|---|
| 5,060,210 A | 10/1991 | Fennema et al. | |
| 5,521,778 A | 5/1996 | Boutaghou et al. | |
| 5,689,057 A * | 11/1997 | Baumgart et al. | 73/1.01 |
| 5,956,217 A * | 9/1999 | Xuan et al. | 360/135 |
| 6,078,468 A | 6/2000 | Fiske | |
| 6,101,058 A | 8/2000 | Morris | |
| 6,154,335 A * | 11/2000 | Smith et al. | 360/75 |
| 6,164,118 A * | 12/2000 | Suzuki et al. | 73/1.89 |
| 6,239,936 B1 * | 5/2001 | Abraham et al. | 360/75 |
| 6,262,868 B1 | 7/2001 | Arya et al. | |
| 6,314,814 B1 * | 11/2001 | Brannon et al. | 73/705 |
| 6,414,827 B1 | 7/2002 | Young et al. | |
| 6,417,981 B1 * | 7/2002 | Smith | 360/75 |
| 6,421,211 B1 | 7/2002 | Hawwa et al. | |
| 6,452,735 B1 * | 9/2002 | Egan et al. | 360/75 |
| 6,452,755 B1 | 9/2002 | Bonin | |
| 6,469,859 B1 | 10/2002 | Chainer et al. | 360/75 |
| 6,490,118 B1 | 12/2002 | Ell et al. | |
| 6,493,177 B1 | 12/2002 | Ell et al. | |
| 6,501,623 B1 | 12/2002 | Sassolini et al. | |
| 6,535,360 B1 | 3/2003 | Kim et al. | |
| 6,542,281 B1 | 4/2003 | Feldman et al. | |

(Continued)

OTHER PUBLICATIONS

Co-pending U.S. Appl. No. to Dallas W. Meyer, U.S. Appl. No. 10/342,920, filed Jan. 13, 2003 (54 pages), and 17 sheets of accompanying drawings.

(Continued)

*Primary Examiner*—Hoa T. Nguyen
*Assistant Examiner*—James L Habermehl
(74) *Attorney, Agent, or Firm*—Workman Nydegger

(57) ABSTRACT

Methods for calibrating and positioning a recording head having a bi-directional transducer for use with a magnetic storage device is disclosed. The bi-directional transducer of the recording head is positioned within the recording head to enable vertical fly height motion and lateral track-to-track motion of the transducer to occur with respect to the surface of a magnetic storage medium within the storage device. Calibration of the bi-directional transducer in the fly height and track-to-track directions enables the transducer to align itself with more precision with the magnetic medium surface, thereby improving data read and write operations for the storage device. Calibration algorithms for fly height and track-to-track adjustment are presented, and possible motion of the bi-directional transducer is resolved into multi-function equations to account for various variables relating to transducer motion.

11 Claims, 11 Drawing Sheets

U.S. PATENT DOCUMENTS

| | | | |
|---|---|---|---|
| 6,545,970 B1 | 4/2003 | Durnin et al. | |
| 6,547,975 B1 | 4/2003 | Kobrin | |
| 6,556,380 B1 | 4/2003 | Bunch et al. | |
| 6,563,665 B1 | 5/2003 | Ell | |
| 6,594,119 B1 | 7/2003 | Koshikawa et al. | 360/294.3 |
| 6,600,619 B1 | 7/2003 | Morris et al. | |
| 6,600,634 B1 | 7/2003 | Kim et al. | |
| 6,611,399 B1 | 8/2003 | Mei et al. | 360/234.7 |
| 6,633,451 B1 | 10/2003 | Chainer et al. | |
| 6,662,623 B1 * | 12/2003 | Baumgartner et al. | 73/1.89 |
| 6,747,836 B1 | 6/2004 | Stevens et al. | |
| 6,762,899 B1 * | 7/2004 | Ottesen et al. | 360/75 |
| 6,768,610 B1 | 7/2004 | Morris et al. | |
| 2003/0093894 A1 | 5/2003 | Dugas et al. | |
| 2003/0161061 A1 | 8/2003 | Lamberts | |
| 2003/0197969 A1 | 10/2003 | Szita et al. | |
| 2004/0085670 A1 * | 5/2004 | Li et al. | 360/75 |

OTHER PUBLICATIONS

Co-pending U.S. Appl. No. to Dallas W. Meyer, U.S. Appl. No. 10/342,615, filed Jan. 13, 2003 (43 pages), and 7 sheets of accompanying drawings.

Co-pending U.S. Appl. No. to Dallas W. Meyer, U.S. Appl. No. 10/728,561, filed Dec. 5, 2003.

Co-pending U.S. Appl. No. to Dallas W. Meyer, U.S. Appl. No. 10/794,482, filed Mar. 5, 2004.

Co-pending U.S. Appl. No. to Dallas W. Meyer, U.S. Appl. No. 10/818,641, filed Apr. 5, 2004.

Co-pending U.S. Appl. No. to Dallas W. Meyer, U.S. Appl. No. 10/900,713, filed Jul. 27, 2004.

* cited by examiner

METHOD OF CALIBRATING MAGNETIC STORAGE MEDIUM BI-DIRECTIONAL RECORDING HEAD

RELATED APPLICATIONS

This application claims the benefit of U.S. Provisional Patent Application Ser. No. 60/445,963, filed Feb. 7, 2003, entitled "Calibration and Transfer Function Determination for Bidirectional Actuation in Storage Systems," which is incorporated herein by reference.

BACKGROUND OF THE INVENTION

1. The Field of the Invention

The present invention relates to data storage on rotating magnetic storage devices. More specifically, the present invention relates to methods used in calibrating and selectively positioning a bidirectional recording head in a magnetic storage device to enable greater positional accuracy during device operation.

2. The Related Technology

During recent years, there has been a steady improvement in the volume of data that can be stored on magnetic storage media, such as hard disk drives used in computers. Today, a single 3.5 inch magnetic storage disk can store twenty gigabytes or more of data. At the same time, storage capacity per unit cost has fallen dramatically, which has enabled individual users and enterprises to radically change the way in which data is recorded and stored. Indeed, the ability to store large volumes of data inexpensively has been a driving factor in the information technology revolution during recent decades.

Conventional storage media include solid-state devices, drive arrays (RAID), single rotating magnetic disk drives, and removable optical media. FIG. 1 is a graph that illustrates tradeoffs between performance and cost associated with typical storage media used in combination with computers. As shown, removable optical storage devices, such as optical read-only or read-write disks, generally provide the least expensive alternative for storing large amounts of data. However, single rotating magnetic devices, such as hard disk drives used in large numbers of personal computers, provide mass storage that is almost as cost effective as removable optical devices, but with better performance. In this context, the term "performance" relates primarily to the reliability and access times associated with the various storage media. As shown in FIG. 1, however, the performance of single rotating magnetic storage devices is increasing less rapidly than the performance of RAID and solid-state devices.

Although magnetic storage devices are widely used and have become significantly less expensive during recent years, a number of technological hurdles have been encountered, which threaten to reduce the rate at which future improvements in cost and performance will occur. FIG. 2 is a perspective view of a conventional magnetic storage device. Magnetic disk drive 10 includes a rotating magnetic storage medium 12 that, as mentioned above, can store tens of gigabytes of data in an area of only a few square inches. A head gimble assembly 14 ("HGA") positions a recording head 16 with a transducer in close proximity to the surface of the magnetic storage medium 12 to enable data to be read from and written to the storage medium. An actuator assembly 18 rotates the HGA 14 during operation to position the transducer of the recording head 16 at the proper location over the rotating magnetic storage medium 12.

One of the most significant problems that has arisen in the effort to improve capacity and performance in magnetic storage devices is track following, or the ability to quickly and reliably position the transducer of the recording head 16 over the appropriate track on the magnetic storage medium 12. In conventional devices, the actuator assembly 18 includes a voice coil that uses a feedback loop based on servo tracks that are embedded between the data tracks on the magnetic storage medium 12. The track pitch (i.e., the spacing between adjacent tracks) of the storage medium 12 in conventional devices is as low as 0.2 microns. At such small track pitches, non-repeatable motions of the rotating magnetic storage medium 12, the HGA 14, and the other mechanical components of disk drive 10 make it increasingly difficult to reliably follow the data tracks on the magnetic storage medium. For example, in devices having an HGA 14 with a length of 1.5 inches to the recording head 16 and a track pitch of 0.2 microns, the angular position of the head gimble assembly needs to have resolution better than 33 millionths of an arc second in order to adequately follow the tracks on the magnetic storage medium 12. Efforts to achieve adequate track following have included the use of smaller disks for high speed drives, fluid motors for improved damping, and active rotational feedback sensors using negative feedback algorithms. However, the use of such techniques can lead to either the loss of capacity or are only temporary solutions to this problem, as track pitches continue to decrease.

A closely related problem is that of the settling time and performance, which relates to the ability to stabilize the recording head over a track. The settling time is dictated by the inertial loads and the exciting resonant frequencies associated with the act of accessing a selected track, the amount of damping in the HGA 14, and the servo bandwidth. These factors are generally limited by the resonant frequencies in the arm of the HGA 14. Thus, settling times have not significantly improved in the last several generations of drives in view of the fundamental limitations on the mechanics of drives that use a recording head 16 controlled by an HGA 14 and an actuator assembly 18, as shown in FIG. 2.

As both the track pitch and the size of sector regions on the magnetic media used to physically record bits of data have decreased, transducers in disk drives have been required to be positioned closer to the surface of the magnetic storage device. A representation of the distance between the transducer and the surface of the magnetic storage medium, referred to as the fly height 22, is shown in FIG. 3. Current fly heights are now as small as 50 Angstroms (Å) in high capacity disk drives. The fly height is dictated by the fundamental resolution requirements associated with the magnetic storage device, which is a function of the track pitch and the size of the regions on which bits of data are physically recorded. If the fly height becomes too large during operation, the transducer becomes unable to resolve bits encoded in the storage medium. On the other hand, if the transducer is brought into physical contact with the optical storage medium, which can be traveling at speeds on the order of 100 miles per hour, both the transducer and the storage device can be damaged.

The fly height has been controlled in conventional devices by improving the manufacturing tolerances, by designing a highly rigid and dampened HGA 14, and by the use of air bearings associated with the recording heads 16. An air bearing is a cushion or layer of air that develops between the surface of the magnetic storage medium and the adjacent surface of the transducer as the storage medium moves underneath the transducer.

As noted above, as the fly heights required in magnetic storage devices have decreased, the problem of transducer damage from excessive media contact has become more pronounced. Current giant magnetoresistance ("GMR") and tunneling magnetoresistance ("TMR") transducer heads are sensitive to being damaged if excessive contact with the storage medium is experienced. One related problem is that conventional transducer designs often lead to thermal pole tip protrusion, which occurs when the transducer is heated and the tip, or pole, of the transducer extends and protrudes beyond the plane of the transducer. Thermal pole tip protrusion can aggravate the contact of the transducer with the storage medium and can lead to increased or more rapid damage of the transducer.

These problems currently facing the magnetic storage device industry threaten to impede the ongoing progress in reliability, performance, and cost that has been achieved during recent years. Although many of these problems can be overcome to some degree using conventional head gimble assembly designs, it is unlikely that these problems can be successfully overcome while keeping costs for disk drive users down.

One approach that is currently being developed to lessen the effects of the challenges discussed above involves a technique called second stage actuation. Second state actuation systems use a dual actuation method for controlling the horizontal tracking position of the head over a servo mark positioned on the surface of the storage medium. A coarse actuator, similar to a HGA, positions the recording head to a global position, and a fine actuator with a single, horizontal degree of freedom at the head positions the head and transducer to a fine position. While this technique can be adequately practiced in connection with previous versions of magnetic storage media, the increased density on newer discs requires closer tolerances on the fly height, as discussed above. As the fly heights of newer storage systems continually decrease, second stage actuation technology becomes increasingly inadequate, particularly in light of the fact that transducer positioning is limited to adjustment in only the horizontal direction.

Additionally, it is known that previous methods have been attempted to measure fly height of a recording head above the surface of a magnetic storage medium. These methods include calculations involving capacitance, ratios of certain harmonic amplitudes, and vibrational aspects of piezo-electric devices mounted on the recording head. However, these methods have proven inadequate in precisely controlling and calibrating fly height and other possible movements of the recording head in newer magnetic storage devices.

SUMMARY OF SELECTED EMBODIMENTS OF THE INVENTION

The present invention generally relates to improving the performance and use of magnetic storage media, such as hard disk drives. More specifically, the present invention is directed to various methods that can be used in calibrating the movement of a recording head with respect to a surface of a magnetic medium within a hard disk drive. Such drives are used, for instance, in a variety of computing devices, including personal computers, servers, database storage devices, consumer electronics, etc.

Embodiments of the present invention are preferably practiced in connection with a hard disk drive or other magnetic storage device having a precision recording head. The precision recording head is moved over a magnetic medium by a coarse actuator. The precision recording head further includes a transducer contained within a bi-directional micropositioner that can be moved independently of the coarse actuator in two orthogonal directions with respect to the magnetic medium surface, thereby enabling, together with the coarse actuator, precise positioning of the transducer over a selected segment of the magnetic medium surface.

The precision recording head discussed above introduces various unique challenges regarding calibration of the micropositioner and transducer in a vertical ("fly height") direction and a lateral ("track-to-track") direction with respect to the magnetic medium surface. By employing one or more of the calibration techniques as disclosed herein, information regarding the movement and position of the micropositioner with respect to the magnetic medium in response to various inputs and conditions can be acquired, which information can then be used to control the positioning of the micropositioner during operation of the disk drive.

In one embodiment, vertical fly height calibration data are acquired by repeatedly passing the recording head over a plurality of varying ridge-encircled depressions formed at specified portions of the surface of the magnetic medium, which in the case of a hard disk drive, is a rotating disk. While this is done, the micropositioner is activated to drop the transducer successively closer to the magnetic medium surface, and hence closer to the ridges of each depression. With each incremental drop toward the magnetic medium surface, a corresponding drop in resistance of a current passed through the transducer is measured and recorded. Upon the gathering of a sufficient amount of these data, extrapolation means can be used to determine the dependence of micropositioner actuation and correspondent movement of the micropositioner. This can then be used to determine desired positioning of the transducer via micropositioner actuation.

In one embodiment, lateral track-to-track calibration data of the micropositioner are acquired in a similar manner to that described above. In detail, the recording head of the hard disk drive is successively passed over a series of magnetic bits that are arranged on the magnetic medium surface separate from or in conjunction with the ridge-encircled depressions used above. The magnetic bits are read by the transducer as the micropositioner passes over the bits. Variation in transducer voltage amplitude as the successive bits are read is charted against similar readings obtained with additional passes of the head over the bits at different lateral positions. The data gathered by this method are used to calibrate track-to-track movement of the micropositioner in response to various micropositioner movements. This can then be used to determine desired positioning of the transducer located in the micropositioner.

In additional embodiments, other techniques are used to determine and account for secondary factors that can affect calibration and movement of the micropositioner over the magnetic medium. These factors include temperature and pressure conditions existing in the hard disk drive, among others.

In one embodiment, interpolation and extrapolation methods can be employed to determine desired fly height and track-to-track micropositioner motions that are not specifically determined during the calibration phases discussed above. Also, periodic re-calibration of the fly height and track-to-track micropositioner movements can take place during drive operation to account for and correct drift that can occur over time.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a particular description of the invention will be rendered by reference to specific embodiments thereof which are illustrated in the appended drawings. Understanding that these drawings depict only typical embodiments of the invention and are not, therefore, intended to be considered limiting of its scope, the invention will be described and explained with additional specificity and detail through the use of the accompanying drawings in which:

FIG. 8b is a perspective cutaway view of the surface of the magnetic storage medium of FIG. 8a, including one of the plurality of depressions shown in FIG. 8a;

DETAILED DESCRIPTION OF SELECTED EMBODIMENTS

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale.

FIGS. 1–15 depict various features of embodiments of the present invention, which is generally directed to structures and methods of calibrating the position of portions of a recording head with respect to a magnetic medium, such as a rotating disk, in a magnetic storage device. Examples of magnetic storage devices can include a hard disk drive used in one of a variety of electronic products. In particular, the calibrating methods disclosed herein are preferably directed for use in calibrating and positioning a recording head having an integrated, bi-directional micropositioner. The micropositioner is configured to be selectively moved in two orthogonal directions with respect to the surface of the magnetic medium, thereby enabling greater precision in positioning a transducer located in the micropositioner near the magnetic medium surface. Calibration of the micropositioner with respect to these two orthogonal directions allows for transducer positioning precision not possible in known devices.

Figure 1:
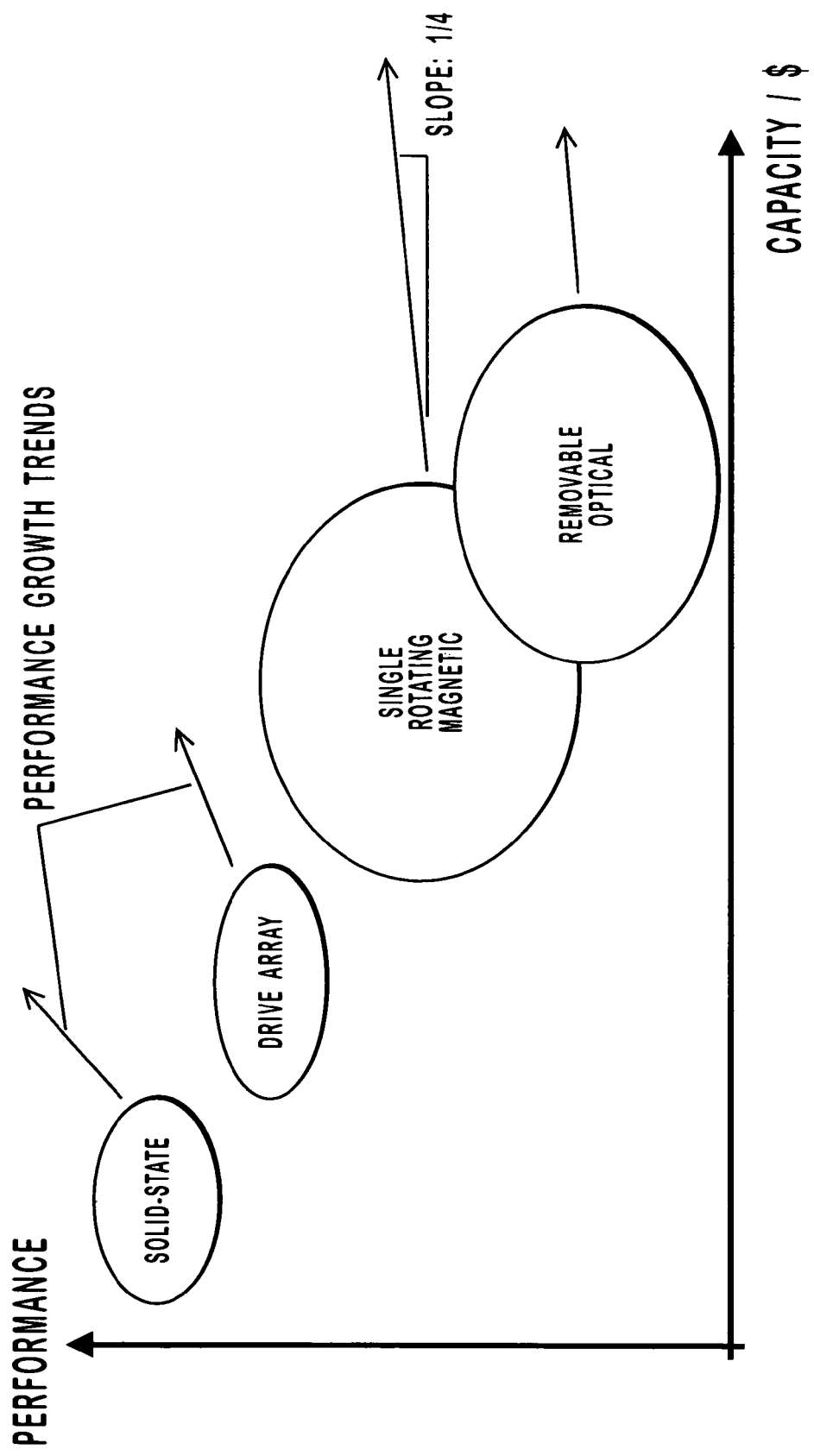
FIG. 1 is a graph that depicts relative cost and performance values of conventional data storage device technologies.
Figure 2:
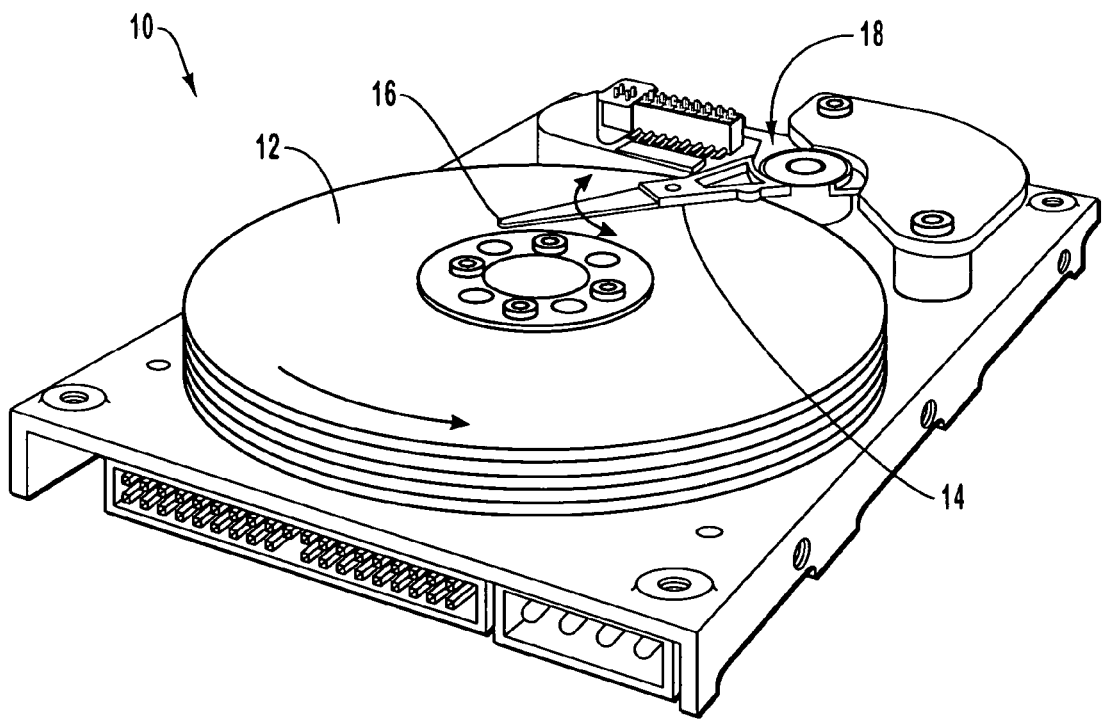
FIG. 2 is a perspective view of a conventional disk drive and head gimble assembly.
Figure 3:
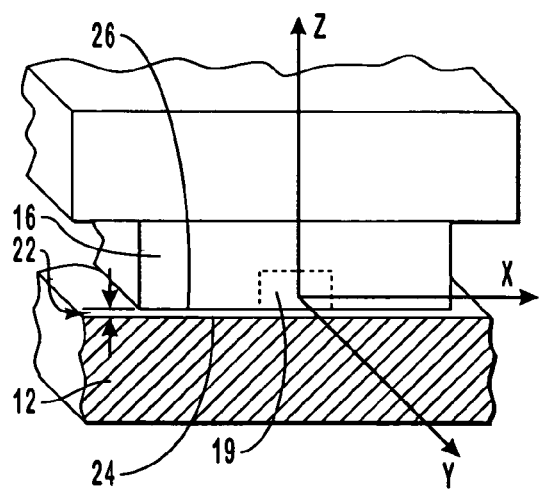
FIG. 3 is a perspective view of the recording head/magnetic storage medium interface of a conventional disk drive.

While FIGS. 2 and 3 illustrate conventional disk drives, these figures set forth a convention regarding a frame of reference that is useful in describing the methods of positioning and calibrating the transducers of the recording heads. As shown in FIG. 2, a rotating magnetic storage medium 12 rotates counterclockwise, such that elements on the storage medium that encode individual bits of data travel under the recording head 16 in a direction that is substantially parallel to the longitudinal axis of the arm of the head/gimble assembly ("HGA") 14. In other words, a particular track of the magnetic storage medium 12, which is concentric with the circumference of the magnetic storage medium, is substantially tangent to the longitudinal axis of the HGA 14 when the track is positioned under recording head 16. This motion of the magnetic storage medium 12 with respect to the HGA 14 defines a trailing edge or surface of the recording head 16 that is distal from the axis of rotation of the HGA 14.

FIG. 3 is a perspective view of the recording head, and shows an elevation of the trailing surface of the recording head 16. In FIG. 3, the motion of the illustrated portion of the magnetic storage medium 12 during operation is generally in the y direction, while the orientation of the data tracks of this portion of the magnetic storage medium is likewise substantially in the y direction. As shown in FIG. 3, the z direction is defined to be perpendicular to the surface of the magnetic storage medium 12. The x direction is defined to be substantially perpendicular to or lateral with respect to the orientation of the tracks. In other words, motion in the x direction can cause the transducer to be laterally moved between tracks or to be centered over a track; thus movement in the x direction is known as track-to-track movement. Because of the small angles involved, the motion of the transducer can be considered to be a translation in the x direction, regardless of whether the motion is a result of the actuation of the micropositioner integrated into the slider body of the recording head 16 or motion associated with the rotation of the HGA 14 about the axis of rotation of the HGA 14. The y axis is defined to be perpendicular to both the x and z axes as shown in FIG. 3.

FIG. 3 also illustrates a fly height 22, which is defined to be the distance in the z direction between the surface 24 of the magnetic storage medium 12 and the adjacent bottom, or air bearing, surface 26 of the recording head transducer. FIG. 3 illustrates the general position of a transducer in region 19 and the relationship thereof to the x, y and z axes and the fly height 22.

The definitions and descriptions to track-to-track, fly height and related concepts as described above are applied in the following discussion in describing various features of embodiments of the present invention. Note that the principles of the present invention to be described below can be reliably used with existing recording media as well as with higher density recording media that will be developed in the future. Also, the discussion to follow focuses on the interaction of a recording head with a top surface of a magnetic storage medium. In other embodiments, however, it should be appreciated that magnetic storage devices having a plurality of recording heads operating in conjunction with a plurality of magnetic storage medium surfaces can also benefit from the present invention. Thus, the description contained herein is merely illustrative of the broader concepts encompassed by the present invention, and is not meant to limit the present invention in any way.

Figure 4:
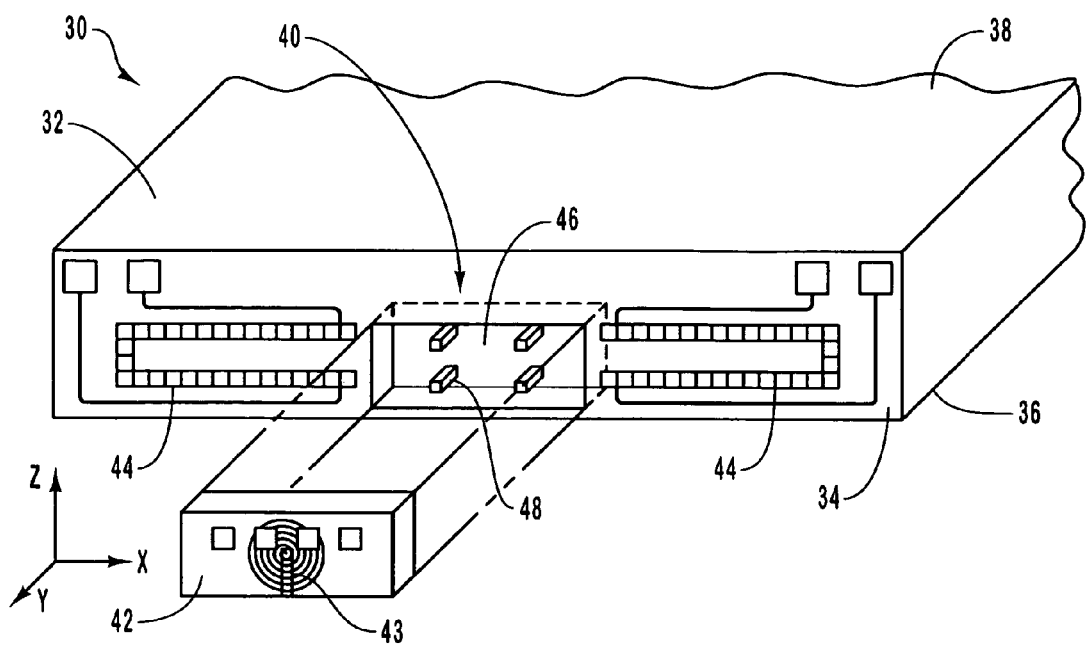
FIG. 4 is a perspective view of a portion of a recording head including a bi-directional micropositioner that is calibrated according to one embodiment.

Reference is now made to FIG. 4, which shows an exploded perspective view of a portion of a micropositioning recording head that can be calibrated and positioned using techniques as disclosed in embodiments of the present invention. As such, the recording head to be described here is merely exemplary of those recording heads that can benefit from the methods and techniques described herein, and is not meant to confine the invention to only the illustrated implementation. A recording head 30 is depicted and forms a component of magnetic storage device, such as a hard disk drive (not shown) for use in reading and writing data to a magnetic medium (not shown here). The recording head 30 includes a slider body 32 having a trailing surface 34 as shown in FIG. 4. Slider body 32 is formed, for example, from alumina, alumina/TIC, another ceramic material, silicon, or silicon plus additional embedded circuitry. The slider body 32 has an air bearing surface 36, which, as shown in FIG. 4, is positioned opposite a top surface 38. The air bearing surface 36 defines an air bearing plane and maintains an appropriate fly height by the generation of an air bearing or air cushion between the air bearing surface and the adjacent surface of the magnetic storage medium.

At or near the trailing surface 34, slider body 32 has integrated therein a micropositioner 40 that controls the position and motion of a corresponding transducer body 42. Micropositioner 40 can be implemented using microelectromechanical systems (MEMS), which use magnetic forces to close a gap between two components that move with respect to each other, or other suitable configuration.

As shown in FIG. 4, the micropositioner 40 includes a pair of toroidal coils 44 that are positioned at opposite ends of a cavity 46 formed in trailing surface 34. As will be explained in greater detail below, toroidal coils 44 can be used to induce a magnetic flux that causes the transducer body 42 to be selectively moved and positioned in either the x or z directions.

FIG. 4 also illustrates various details regarding the transducer body 42, which is a discrete component that is movably connected to the slider body 32 in order to permit bi-directional motion in the z and x directions, shown in FIG. 4, of a transducer 43 positioned in the transducer body 42. The transducer 43 here includes both a write element and a read element for respectively encoding and decoding magnetic data to and from a magnetic medium surface, such as that shown at 47 in FIG. 5.

The exemplary transducer body 42 of FIG. 4 is eutectically or otherwise bonded to a plurality of flexible posts or flexure members 48 positioned in cavity 46. It is noted that, in the embodiment of FIG. 2, flexible posts 48 have longitudinal axes that are aligned in the y direction, or the direction perpendicular to the trailing surface 34. When connected to flexible posts 48, transducer body 42 can move in the z or x directions under the control of the toroidal coils 44 as the flexible posts 48 deflect under the forces generated by the coils. Movement of the transducer body 42 can be in the z direction only, the x direction only, or in a direction that is some combination of the z and x directions. Further details regarding the recording head, including the micropositioning transducer body discussed above, can be found in U.S. application Ser. No. 10/342,920, entitled "Integrated Recording Head Micropositioner for Magnetic Storage Devices," filed Jan. 13, 2003, which is incorporated herein by reference in its entirety.

Figure 5:
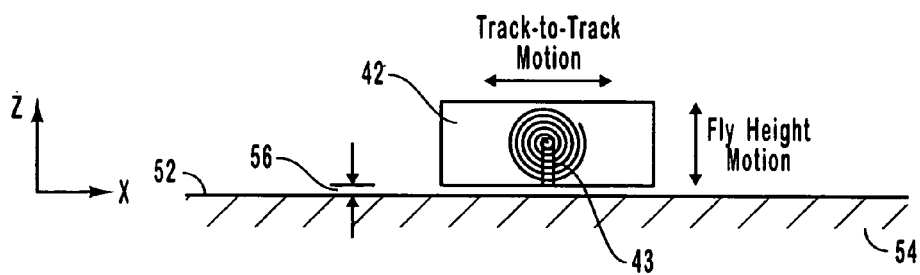
FIG. 5 is a front view of the interface between the micropositioner of FIG. 4 and the surface of a magnetic storage medium, indicating the lateral track-to-track and vertical fly height directions of possible micropositioner movement.

Reference is now made to FIG. 5, which shows the transducer body 42 from FIG. 4 in isolation and in operational position with respect to a surface 52 of a magnetic medium 54, such as a rotating disk. As shown, the transducer body 42 resides at a fly height 56 above the magnetic medium surface 52. As explained above, the micropositioner 40 enables bidirectional movement of the transducer body 42 to occur according to actuation of one or both toroidal coils 44 that are located on the slider body 32 (FIG. 4). This enables movement of the transducer body 42 along two orthogonal axes x and z, as noted in FIG. 5. For convenience, lateral movement of the transducer body 42 along the x-axis is referred to as track-to-track motion, and is characterized by motion of the body substantially parallel to the magnetic medium surface 54. Correspondingly, vertical movement of the transducer body 42 along the z-axis is referred to as fly height motion, and is characterized by motion of the body substantially perpendicular to the magnetic medium surface 52. The track-to-track and fly height motions of the transducer body 42 are independent of any movement of the recording head, and hence the transducer body, by a coarse actuator, such as the actuator assembly 18 shown in FIG. 2. Thus, the transducer body 42 is configured as having two degrees of motional freedom, as enabled by the micropositioner 40 (FIG. 4). When combined with the coarse motion offered by the actuator assembly, three degrees of motional freedom are achieved. As data is compressed to ever-smaller spaces on the magnetic medium, precise movement of the transducer body about these degrees of freedom becomes increasingly critical to ensure that the data are properly accessed and/or recorded.

Figure 6A:
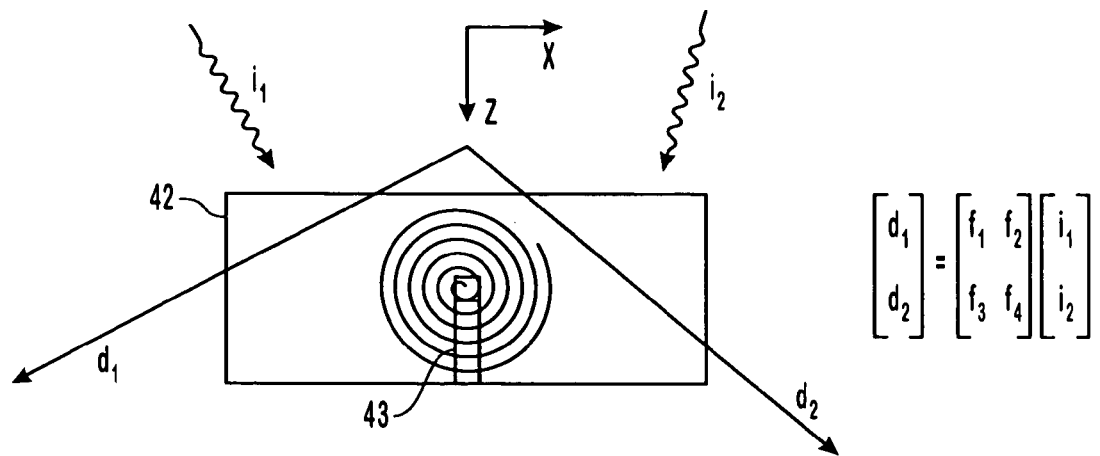
FIG. 6a is a front view of the micropositioner of FIG. 4, illustrating various details regarding possible directions of micropositioner movement.
Figure 6B:
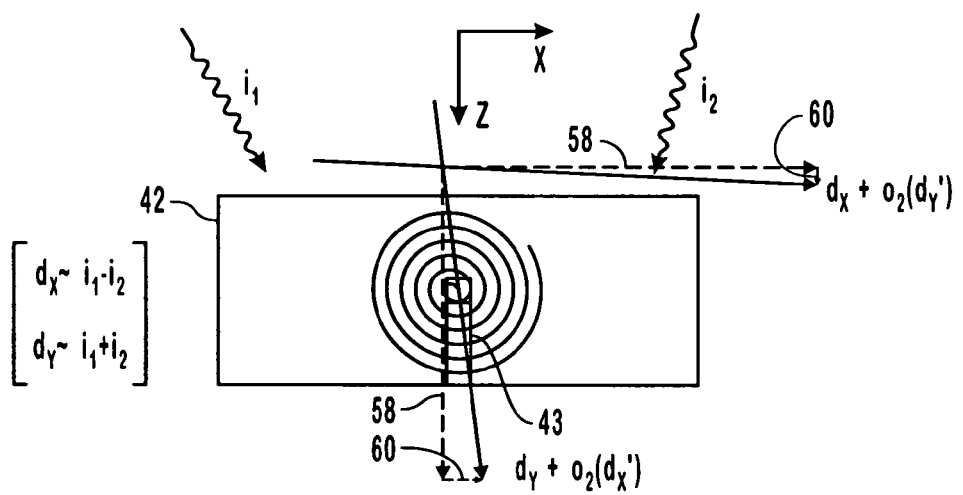
FIG. 6b is a front view of the micropositioner of FIG. 4, illustrating various details regarding possible directions of micropositioner movement.

Reference is now made to FIGS. 6a and 6b, which show possible movements of the transducer body 42 under influence from the toroidal coils 44 (FIG. 4), or other suitable driving apparatus. The toroidal coils 44 are driven by input signals $i_1$ and $i_2$. In one embodiment, signals $i_1$ and $i_2$ represent current biases, while in other embodiments, voltage biases can be used for each signal. For simplicity, the following discussion will use current bias.

Many movements of the transducer body 42 involve a combination of orthogonal movements in the track-to-track and fly height directions in response to the input signals $i_1$ and $i_2$. This can result in movements of the transducer body 42 along directional lines $d_1$ and $d_2$, as shown in FIG. 6a. Further, these motions can be affected by a plurality of factors. These factors are represented by the functions $f_1-f_4$ as well as the bias currents $i_1$ and $i_2$, and are generally described by the matrices shown in FIGS. 6a and 6b. The calibration and positioning methods to be described further below are concerned with defining each of these functions $f_1-f_4$ to enable proper positioning of the transducer body during operation of the magnetic storage device.

In one embodiment, the calibration technique and analysis to be given herein can be simplified if the track-to-track and fly height motions are described in terms of a combination of the two input signal $i_1$ and $i_2$. This enables first order functions $f_1$ and $f_4$ to describe the motion of the transducer body 42 in a combination of the orthogonal track-to-track and fly height motions. For example, it is possible to assume in one embodiment that the micropositioner 40 generates inputs $i_1$ and $i_2$ such that a combination of $i_1+i_2$ and $i_1-i_2$ (or $V_1+V_2$, $V_1-V_2$) is adequate to describe first order motions of the transducer body 42, indicated by the solid arrows in FIG. 6b, largely in terms of the track-to-track and fly height directions, as indicated by the dashed lines 58 in FIG. 6b. In addition, smaller cross-term functions $f_2$ and $f_3$ are included to account for less influential factors, such as manufacturing imperfections, etc. These cross terms are represented in FIG. 6b by the dashed lines 60, and will be discussed further below.

1. Fly Height Actuator Calibration

Figure 7A:
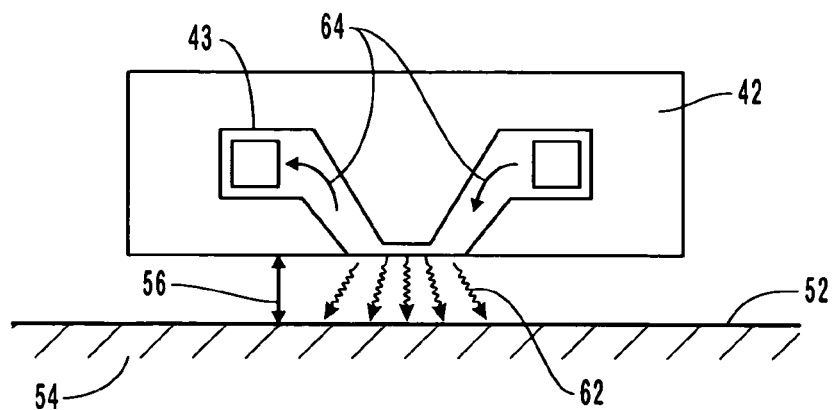
FIG. 7a is a cross-sectional view of a transducer positioned in the micropositioner of FIG. 4, illustrating various details regarding heat transfer between a transducer and the surface of the magnetic storage medium.
Figure 7B:
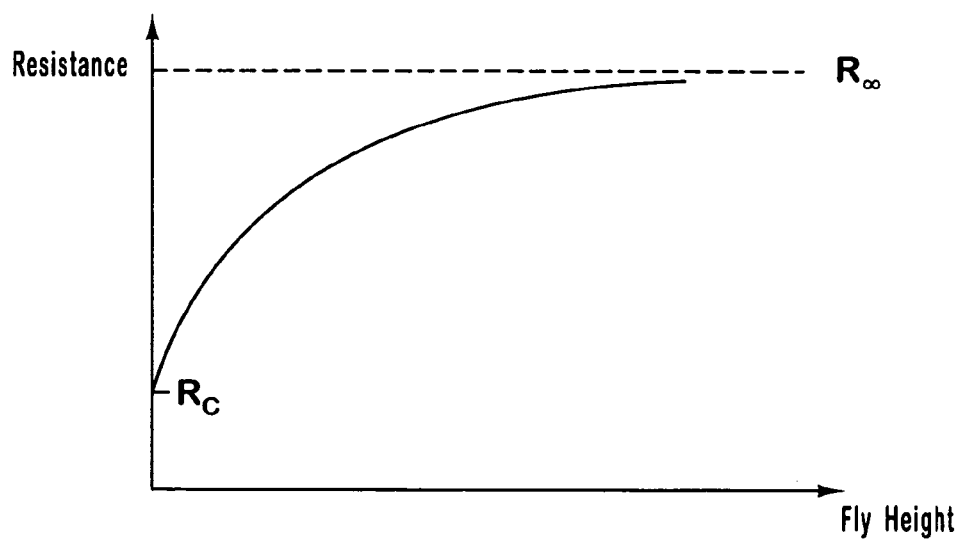
FIG. 7b is a graph charting transducer resistance versus micropositioner fly height in accordance with one embodiment.

Reference is now generally made to FIGS. 7a and 7b. In one embodiment, a method is disclosed to provide calibration data for accurately positioning the transducer body 42 (FIGS. 4, 5) at a desired fly height with respect to the magnetic medium surface 52 (FIG. 5). Generally, the method utilizes principles of thermal conductivity together with a relationship existing between the spacing of the transducer 43 in the transducer body 42 and the surface 52 of the magnetic medium. In Particular, a transducer, when electrically biased, possesses a certain amount of resistance. This resistance can be varied according to the proximity of the transducer to the magnetic medium surface 52, due to increased thermal conduction and/or radiation of heat, indicated at 62 in FIG. 7a, from the transducer to the medium surface. The frequency response of this effect is very high, exceeding 100 kHz. Notwithstanding this, the amount of heat dissipated by the transducer 43 into the comparatively large magnetic medium 54 is typically such that it does not significantly affect the temperature of the magnetic medium , even when it is at rest.

The effect discussed above is graphically represented in FIG. 7b, wherein transducer resistance is plotted versus fly height of the transducer. As shown, transducer resistance decreases as fly height 56 decreases. Indeed, transducer resistance is minimized when the transducer contacts the surface of the magnetic medium, as indicated at $R_c$. In contrast, transducer resistance rises toward $R_\infty$ as the fly height 56 increases. In practice, the analytical nature of this relationship is complex, given the geometries and multiple layers of materials involved in actual transducer implementations, as well as the competing effects of thermal conduction and radiation to the ambient surroundings when the transducer is positioned relatively far away from the magnetic medium surface vs. thermal transfer to the medium surface as the fly height 56 is reduced. The general relationship is represented by the following equation:

$$R(FH, i_{bias}) = R_\infty(i_{bias}) - [R_\infty(i_{bias}) - R_c(i_{bias})]\exp(-A*FH) \quad (1)$$

or, expressed another way:

$$FH = \{-\ln[(R_\infty(i_{bias}) - R(FH, i_{bias})/(R_\infty(i_{bias}) - R_c(i_{bias}))]\}/A \quad (2)$$

where:
$i_{bias}$ is the bias applied to the transducer element;
FH is the fly height, or spacing between the transducer element and the magnetic medium surface;
R is the measured resistance at a specified FH;
$R_\infty$ is the measured resistance at infinity (generally when FH>1 micrometer), and is a function of bias;
$R_c$ is the measured resistance at contact between the transducer element and the magnetic medium surface; and
A is a constant that is dependent on ambient temperature and bias.

To determine the value of $R_\infty$, $R_c$, and A, several steps can be executed. First, while maintaining the magnetic medium 54 stationary, the transducer 43 is biased, as indicated in FIG. 7a by the arrows 64, and the absolute resistance is measured with no current (or voltage) applied to the micropositioner 40 (FIG. 4), thereby maintaining the transducer body in a nominal position with respect to magnetic medium surface 52. The resistance measured in this step is recorded as $R_\infty$.

Next, with the magnetic medium 54 remaining stationary, the micropositioner 40 is iteratively biased at a plurality of bias levels conforming to the bias pattern $i_1+i_2$, $i_1=i_2$, wherein the magnitudes of bias inputs $i_1$ and $i_2$ are equal in each iteration, and the sum of the magnitudes varies with each iteration. Thus, in one iteration $i_1$ can equal 50 mA and $i_2$ can equal 50 mA to equal a sum of 100 mA; in another iteration, $i_1$ can equal 60 mA and $i_2$ can equal 60 mA to equal a sum of 120 mA. These iterations cause the transducer body 42 to be incrementally moved toward the surface 52 of the magnetic storage medium 54. This in turn causes the resistance in the transducer 43 to drop as it approaches the magnetic medium surface 52. The resistance is minimized in the transducer 43 when the micropositioner 40 is biased to the point that the transducer body 42, and thus the transducer 43, physically contacts a flat portion of the magnetic medium surface 52. At this point, further biasing increases of the micropositioner 40 are halted and the transducer resistance is recorded as $R_c$.

Figure 8A:
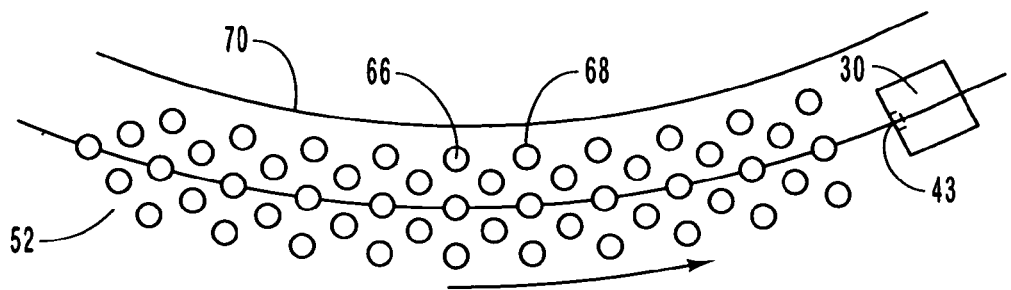
FIG. 8a is a top view of a plurality of depressions that are formed on the surface of the magnetic storage medium for use in calibrating the fly height of the micropositioner according to one embodiment.
Figure 8B:
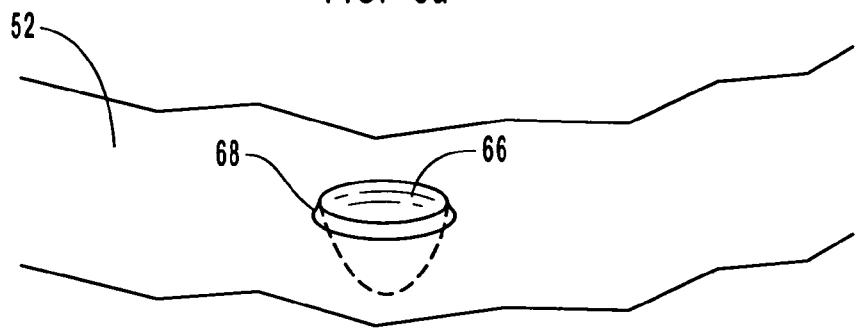

Reference is now made to FIGS. 8a–8d in describing subsequent steps that are taken to determine the slope A according to equations (1) and (2) above. FIG. 8a shows a plurality of circular, ridge-lined depressions 66 that are formed on a portion of the surface 52 of the magnetic medium 54. As shown in FIG. 8b, each depression 66 creates a cavity in the magnetic medium surface 52. The depression is bounded by a ridge 68. The ridge 68 is used as explained below to assist in the calibration of the fly height 56.

Figure 8C:
FIG. 8c is a cross-sectional side view of a row of depressions formed on the surface of the magnetic storage medium as in FIG. 8a, the depressions having progressively differing shapes with respect to one another.
Figure 8D:
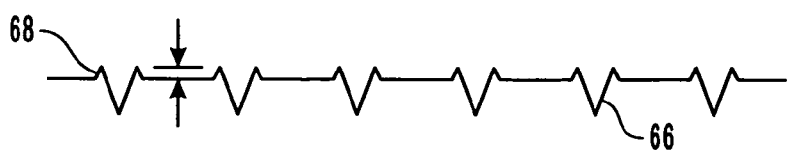
FIG. 8d is a cross-sectional side view of a row of depressions formed on the surface of the magnetic storage medium as in FIG. 8a, the depressions having a uniform shape with respect to one another.

FIG. 8c shows a cross sectional view of some of the depressions 66 formed according to one embodiment, wherein the ridges 68 of the depressions 66 progressively extend at greater distances above the magnetic medium surface 52, and the depressions correspondingly progressively extend at greater distances below the magnetic medium surface, as depressions following an arcuate line around the disk-like surface of the magnetic medium are inspected. For instance, FIG. 8c shows the ridge heights varying from a height of approximately 60 angstroms to a height of approximately 160 angstroms. Though the description to follow assumes that such a ridge/depression arrangement as seen in FIG. 8c is used, in other embodiments it is possible to use other configurations, such as that shown in FIG. 8d, wherein the ridges and depressions are uniformly sized and shaped. Moreover, features having other shapes and configurations can also be used.

As shown in FIG. 8a, the depressions 66 in this embodiment are arranged in an arcuate segment whose arcuate shape generally follows the concentric track pattern. In addition, the depressions 66 are arranged near an inner radius 70 of the magnetic medium surface 52. This configuration enables the recording head 30 (FIG. 4) to be biased against an inner crash stop (not shown) of the magnetic storage device, thereby offering stability to the recording head during the process discussed below. Alternatively, the depressions can be arranged near an outer radius of the magnetic medium surface 52.

Using the features of the magnetic medium 54 described above, the calibration process is continued, wherein the magnetic medium 54 is spun up in the direction of the arrow, with the recording head 30 being positioned such that it is flown over the depressions 66, as shown in FIG. 8a. Multiple rows of the depressions 66 are arranged on the magnetic medium surface 52 as shown in FIG. 8a to ensure that at least some of the ridge-lined depressions 66 pass under the recording head 30 to account for small variations in build tolerances during the manufacturing phase of the magnetic storage device.

While the depressions 66 are spun beneath the recording head 30, the micropositioner 40 is first biased at a minimum bias level at $i_1+i_2$, and $i_1=i_2$, as before, to cause movement of the transducer body 42 slightly toward the magnetic medium surface 52. Resistance of the transducer 43 is then monitored as a function of passing over the plurality of differently-sized depressions 66 and ridges 68.

This process is iteratively repeated, with the micropositioner bias increased for each iteration, as was done in connection with the steps performed to find the variable $R_c$ above, thereby causing the transducer 43 to be successively brought into closer proximity with the spinning magnetic medium surface 52. For the initial iterations, no change in transducer resistance is detected, given the relatively large transducer-to-magnetic medium surface separation. For each iteration, a resistance profile is recorded.

Figure 9:
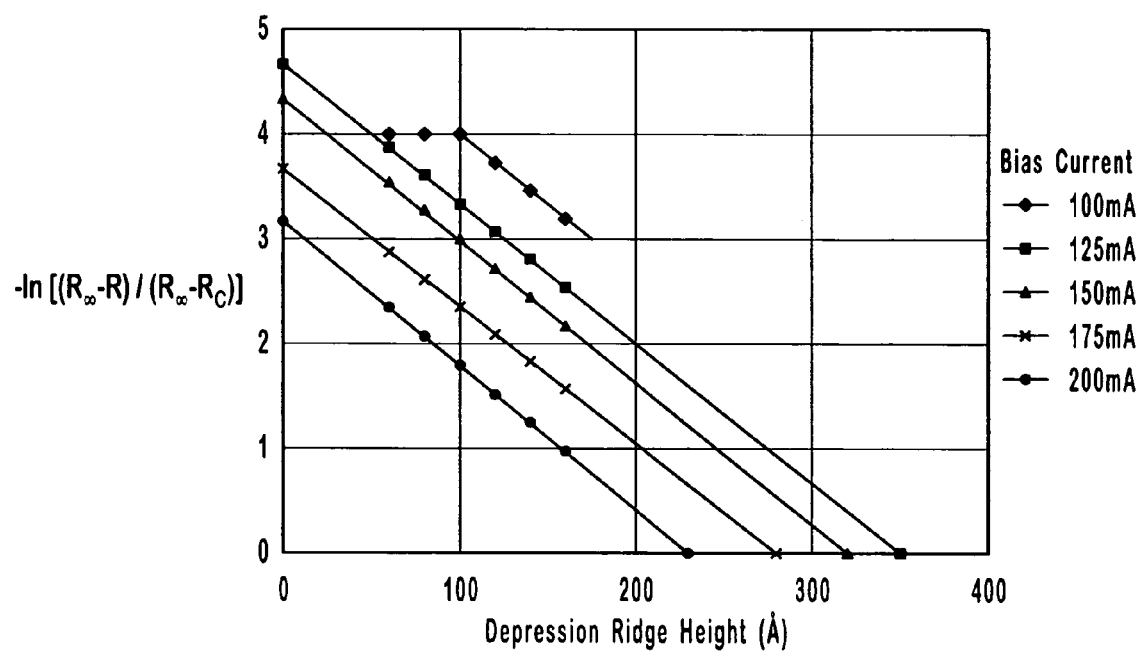
FIG. 9 is a graph showing $-\ln[(R_\infty-R)\backslash(R_\infty-R_c)]$ versus depression ridge height according to one embodiment.

After a certain number of iterations using the above process, a resistance change will be noted in the transducer 43 of the transducer body 42, which has been successively dropped near the magnetic medium surface 52 by way of iterative bias increases in $i_1$ and $i_2$ that are supplied to the toroidal coils 44 of the micropositioner 40 (FIG. 4). The actuator bias level of each iteration performed can be charted as a line on the graph, which depicts $-\ln[(R_\infty-R)/(R_\infty-R_c)]$ versus depression ridge height, as shown in FIG. 9. This graph shows that, as the transducer 43 passes over a ridge 68, the transducer resistance (R) changes based on the height of the ridge. In short, the higher the ridge 68, the lower the resistance measured in the transducer 43, given that the transducer is relatively closer to the top of the ridge.

The vertical y-intercept of the graph shown in FIG. 9 corresponds to the case when there is no bump and R is at its lowest value for the particular micropositioner bias. At the horizontal x-intercept, by contrast, $\ln[(R_\infty-R)/(R_\infty-R_c)]=0$. Since, by definition, $\ln(1)=0$, any of the lines in FIG. 9 will cross the x-intercept line when $(R_\infty-R)/(R_\infty-R_c)=1$, which occurs when $R=R_c$. Thus, the x-intercept corresponds to the case when at least one of the ridges 68 is high enough to physically contact the transducer 43. The height of such a ridge, then, corresponds to the fly height 56 of the transducer 43 above the magnetic medium surface 52.

The graph depicted in FIG. 9 can be created in one, embodiment once three measurements of a changing transducer resistance have been observed at each micropositioner current bias level. The measurements are represented as data points in FIG. 9. Then, a regression is performed to fit a line to the data points corresponding to the various micropositioner current bias levels. The regression-produced lines enable the slope (A) and y-intercept to be extrapolated for each level of micropositioner current bias.

The fly height can also be extrapolated from the graph of FIG. 9 that is produced by following the above steps. The fly height 56 of the transducer 43 is represented on the graph of FIG. 9 by the horizontal x-intercept. To determine the x-intercept, the standard point-slope form of a line is used: $y=mx+b$, where m is the slope and b is the y-intercept. Solving for x, the equation becomes: $x=(y-b)/m$. At the x-intercept, $y=0$ and the general equation is: $x=-b/m$. Applying this to the graph of FIG. 9, the equation becomes $x=-b/A$. Thus, the flying height 56 corresponding to a particular micropositioner current bias is equal to the negative value of the y-intercept divided by the slope (A). This extrapolation method allows transducer fly height vs. micropositioner current bias to be determined without risking contact between the transducer and the magnetic medium surface, thereby avoiding damage to the transducer.

The transducer resistance measurement and regression analysis detailed above can be repeated for each increasing micropositioner current bias levels until a fly height is achieved in the range approximately between 0 and 100 angstroms.

The graph and data represented in FIG. 9 can then be used to create a fly height vs. actuation bias current table, as shown in Table 1 below. Table 1 represents pertinent data relating to five current biases, wherein each bias current shown in the table is the sum of bias current $i_1$ and $i_2$ that are input to the micropositioner 40 (FIG. 4). Though the table shows only five bias current entries, a larger number than this can be acquired in order to improve calibration accuracy. It is noted that a similar process can be followed using ridges and depressions that are uniform in size, as in FIG. 8d.

TABLE 1

Fly Height vs. Measured Micropositioner Bias Currents

| Bias Current (ma) | Slope | Y Intercept | Fly Height (Å) | FH (Ave. Slope) (Å) |
|---|---|---|---|---|
| 100 | | | | |
| 125 | −0.01176 | 4.1184 | 350.2041 | 345.7935 |
| 150 | −0.01194 | 3.8904 | 319.0452 | 319.8489 |
| 175 | −0.0121 | 3.3367 | 275.7603 | 280.1595 |
| 200 | −0.01185 | 2.7745 | 234.135 | 232.9555 |
| Average | −0.011913 | | | |

The processes spoken of in this section can be used to solve equation 2 above, thereby relating transducer fly height to the plurality of variables described therein.

Figure 10:
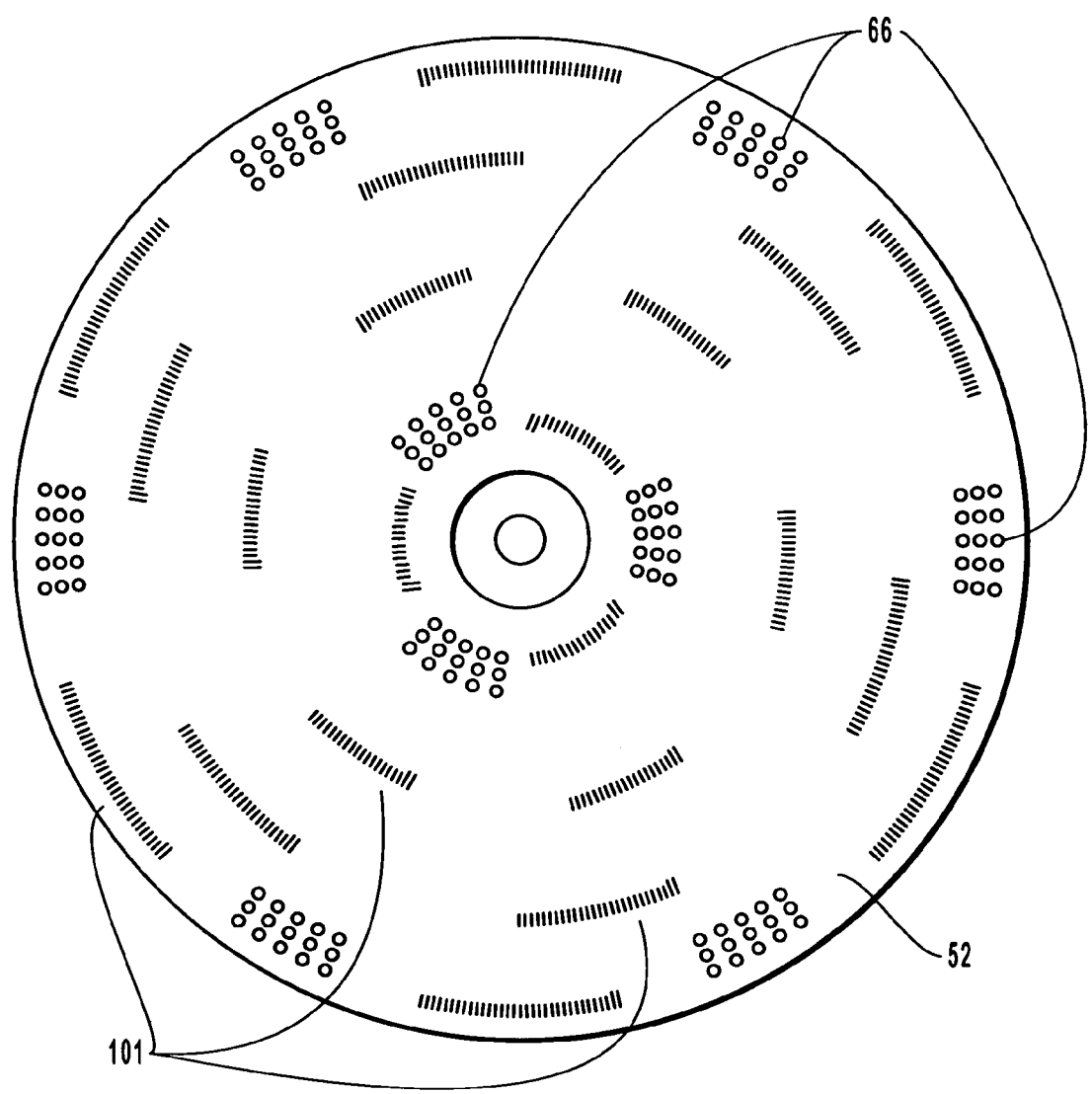
FIG. 10 is a top view of the surface of the magnetic storage medium, showing various regions of depressions as depicted in FIG. 8a, as well as a plurality of magnetic bit zones, according to one embodiment of the invention.

In one embodiment, equation 2 above can also include a weak function relating to the radial position of the transducer 43 with respect to the magnetic medium surface 52, due to factors such as skew angles involved in moving the recording head above the magnetic medium surface. These effects can be taken into account in one embodiment by performing the calibration methods described in this section at both an outer and intermediate radius of the magnetic medium surface 52, in addition to the inner radius. FIG. 10 illustrates the magnetic medium surface 52 including a plurality of regions of ridged depressions 66 dispersed at various radial distances from the center of the magnetic medium surface to enable calibration methods to be performed at various selected radial distances.

More generally, it should be appreciated that the possible motions of the transducer body 42 (FIG. 4) can be defined in terms of multiple functions. Specifically, motion of the transducer body 42 can be described by a first, stronger function related to one of the orthogonal direction, such as the vertical fly height direction, and a second, weaker function related to the other orthogonal direction, such as the horizontal track-to-track direction. The characterization of transducer body movement in terms of these functions can simplify the equations of motion needed to fully describe such movement. For example, for the transducer body 42 of FIG. 6b, the motions can be written to a first order as functions of $i_1+i_2$ ($i_1=i_2$) for flying height, and $i_1-i_2$ ($i_1=-i_2$) for track-to-track motions. So configured, a transfer function matrix can be defined and written as, $$\begin{vmatrix} T \\ FH \end{vmatrix} = \begin{vmatrix} f_1 & f_2 \\ f_3 & f_4 \end{vmatrix} \begin{vmatrix} i_1 - i_2 \\ i_1 + i_2 \end{vmatrix} \quad (3)$$

where T denotes track-to-track motion and FH denotes the flying height. Solving equation (3) yields:

$$T = f_1(i_1-i_2) + f_2(i_1+i_2); \text{ and} \quad (4)$$

$$FH = f_3(i_1-i_2) + f_4(i_1+i_2). \quad (5)$$

Equations (4) and (5) are useful in describing motion of the micropositioner in those cases where such motion is not ideal, i.e., where motion predominately occurs in one direction (represented by functions $f_1$ and $f_4$ in equations (4) and (5), respectively, but includes at least some motion in the orthogonal direction (represented by functions $f_2$ and $f_3$ in equations (4) and (5), respectively). Note that, for reference, equation (2) discussed above primarily defines function $f_4$ of equation (5), in one embodiment. In those cases where micropositioner motion is ideal, such as in the case of a perfectly aligned micropositioner, the value of functions $f_2$ and $f_3$ is zero.

It is noted that each of the functions $f_1-f_4$ is non-linear, is dependent upon $i_1$, $i_2$, and r (the radius of the magnetic medium 54), and has a weak dependence on temperature and pressure (Φ, P). In addition, functions $f_2$ and $f_3$ are of second order or higher.

2. Calibration for Track-Track Motion

Figure 11:
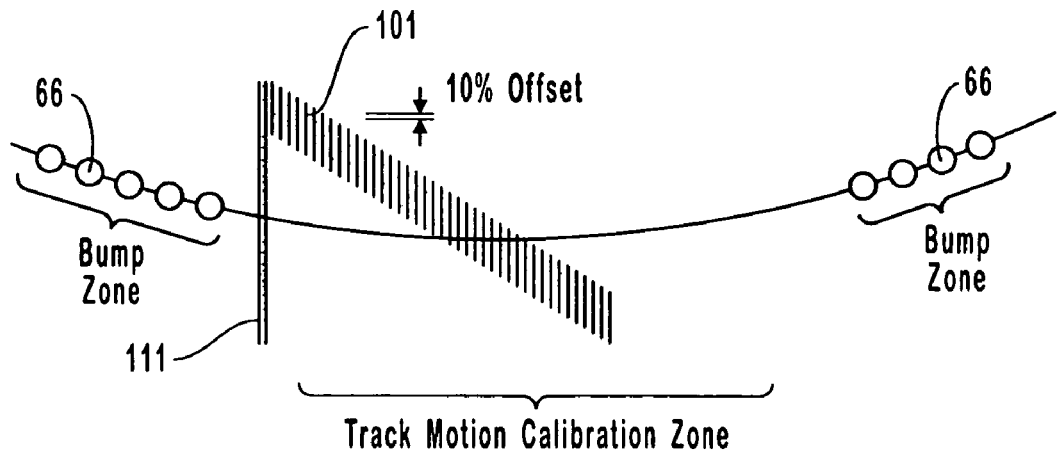
FIG. 11 is a top view of the surface of the magnetic storage medium shown in FIG. 10, including a close-up view of a series of elongated magnetic bits for use in calibrating the track-to-track motion of the micropositioner according to one embodiment.

With continuing reference to FIG. 10, reference is now made to FIG. 11. As with fly height calibration, calibration of track-to-track motion of the transducer body 42 can be performed in accordance with embodiments of the present invention to ensure precise positioning of the transducer 43 (FIG. 4). Track-to track calibration is performed in connection with one or more sets of a plurality of magnetic bits 101 that are written to the magnetic medium surface 52. As shown in FIG. 10, the magnetic bits 101 are written with a tight tolerance write head during manufacture of the magnetic medium 54 as to be grouped in sets that are located in various regions of the magnetic medium surface 52. In one embodiment, these bits are pre-written during media manufacturing, using a tight tolerance write head. Each set of magnetic bits 101 is positioned in a slanted configuration across the magnetic medium surface 52 such that each bit is offset from adjacent bits. FIG. 11 shows this arrangement, wherein a 10% offset is used between adjacent bits. In addition, the sets of magnetic bits 101 in one embodiment are interposed between sets of depressions 66 that are also defined on the magnetic medium surface 52. Alternatively the magnetic bits can be written to the magnetic medium surface as to be atop or adjacent to the depressions 66. Also, each set of magnetic bits can be preceded by a clock bit 111. In any of the above cases, the shape and spacing of the magnetic bits 101 are well defined in order to enable the calibration to take place.

In calibrating the track-to-track transducer body motion with respect to the magnetic medium surface 52, a safe fly height is determined for a combination of micropositioner current bias inputs $i_1+i_2$, using the calibration data from section 1 above. While holding the safe fly height and its corresponding bias inputs fixed, a selected set of the magnetic bits 101 are read from the magnetic medium surface 52 while iteratively varying the micropositioner bias currents conforming to the bias pattern $i_1-i_2$ ($i_1+i_2$), wherein the sum of the bias magnitudes of inputs ii and $i_2$ is held fixed (which corresponds to the safe fly height), while the magnitude of each input is inversely varied with respect to one another in order to maintain the sum of the inputs constant. Thus, in one iteration $i_1$ can equal 50 mA and $i_2$ can equal 50 ma to equal the constant sum of 100 mA. In another iteration, $i_1$ can equal 40 mA while $i_2$ can equal 60 mA to equal the constant sum of 100 mA. In the first iteration, fluctuations of the voltage amplitude in the read head (not shown) of the transducer 43 (FIG. 4) can be recorded as the set of magnetic bits 101 are read by the read head while the transducer body is maintained at a specified track-to-track position by the biased micropositioner 40 (FIG. 4).

Figure 12:
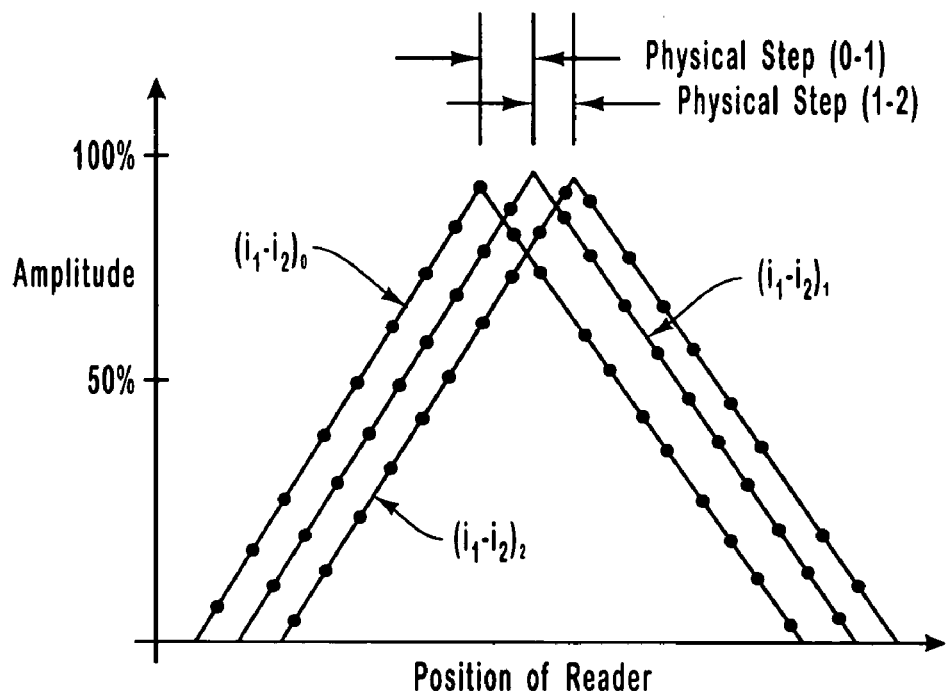
FIG. 12 is a graph showing transducer amplitude versus recording head position relating to the calibration of track-to-track motion of the micropositioner according to one embodiment.

In each subsequent iteration, successive voltage amplitude drops in the transducer 43 as it reads the passing magnetic bits 101 are recorded in accordance with the new bias current setting of the micropositioner 40, wherein each new bias current setting re-positions the transducer body 42 in the lateral track-to-track direction. These data relating to voltage amplitude variation in the read head as it reads each of the bits or bit portions (depending on the position of the read head with respect to the bit) can then be charted as shown in FIG. 12 to determine the total track-to-track distance moved. These data in turn provide an absolute calibration between micropositioner bias current and the track-to-track motion of the transducer 42 with respect to the magnetic medium surface 52.

3. Other Calibrations

The functions $f_1$ and $f_4$ of equations (4) and (5), respectively, are first order functions and are largely controlling in describing the track-to-track and fly height motions. In contrast, the functions $f_2$ and $f_3$ are cross functions having less influence on these motions. The cross function $f_2$ can be determined in one embodiment by repeating or combining the measurements taken above. In particular, the cross function, $f_2$, as shown in the matrix equation of FIG. 6a and described in equation (4), can be determined by measuring resultant track-to-track motions by varying the value of $i_1+i_2$, where $i_1=i_2$, by using the track-track calibration method discussed above. In this embodiment, $i_1=i_2$ so as to cancel out the function $f_1$ in equation (4).

Similarly, the cross relationship $f_3$, as shown in the matrix equation of FIG. 6a and described in equation (5), can be determined by performing the fly height calibration procedures described above while varying $i_1-i_2$, where $i_1=-i_2$ so as to cancel out the function $f_4$ in equation (5).

Figure 13:
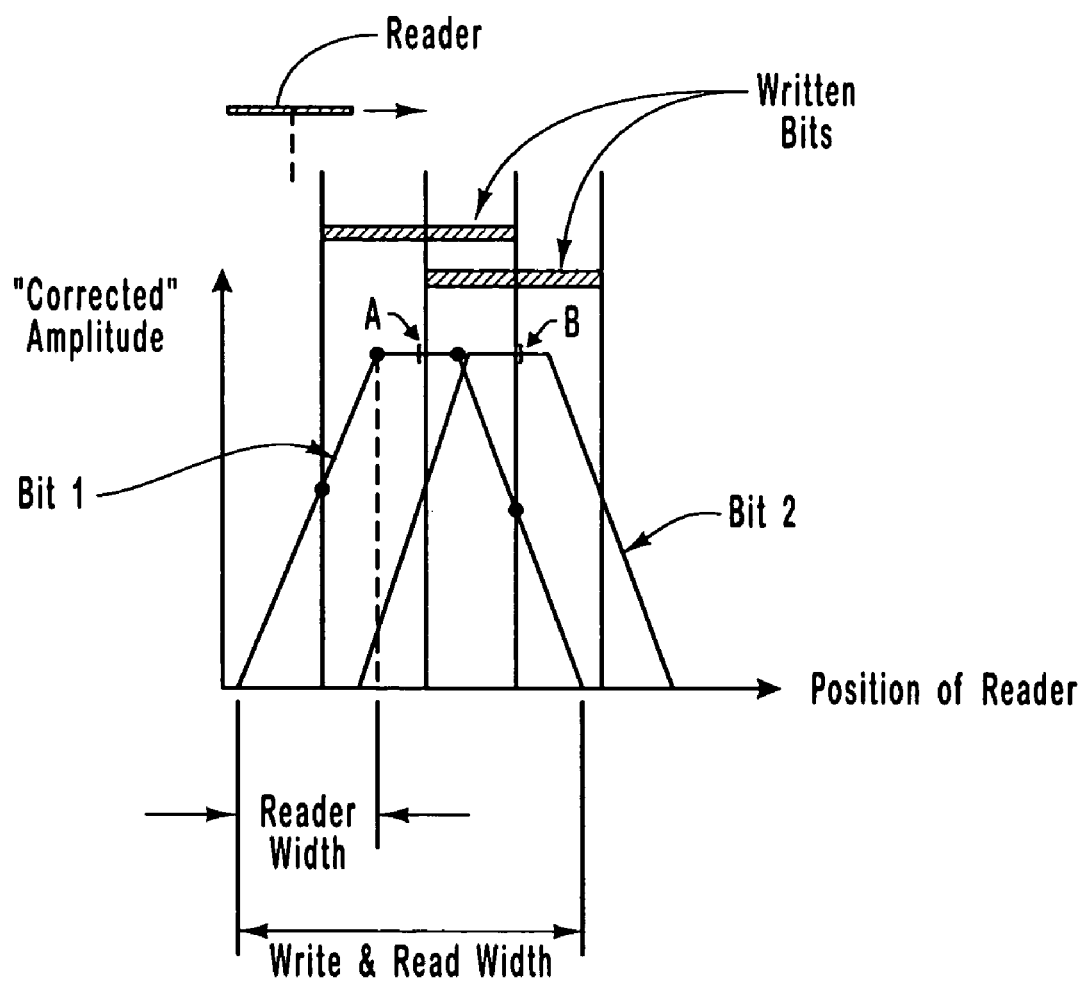
FIG. 13 is a graph showing corrected transducer amplitude versus recording head position relating to the calibration of the track-to-track motion of the micropositioner according to one embodiment.

Reference is now made to FIG. 13. In one embodiment, the widths of the data head writer and reader of the transducer 43, as well as the offset between the data head reader and writer, can be determined by writing a series of offset bits with the head writer to a specified location on the magnetic medium surface 52, while positioning the transducer by biasing the micropositioner 40. Once written, the offset bits are then read by the head reader of the transducer 43, and the results are recorded, as shown in FIG. 13. To improve the accuracy, the full calibration values as determined in the previous sections above and represented in equations (4) and (5) can be used in this process, wherein the micropositioner motion is first calibrated in terms off $f_1$–$f_4$. This process significantly improves read width and write width determination accuracy over known methods, which use only the coarse actuator for such determination.

4. Intermediate Radii Fly Height Calibration

The fly height transfer functions shown in equation (5) may possess a relatively greater dependence on radial transducer position with respect to the magnetic medium surface than the track-to-track transfer functions shown in equation (4). This is due to the fact that the fly height is highly non-linear and depends on such factors of air bearing stiffness, yaw angles, etc. This is dealt with in one embodiment by defining multiple regions of depressions 66 on the magnetic medium surface 52, as shown in FIG. 10 and briefly described above. As such, the flying height dependence on radius is accounted for, and the function $f_4$ of equation (5) can be defined as an interpolation function along the radius of the magnetic medium surface.

In contrast, the track-to-track transfer functions shown in equation (4) possess a nearly linear relation from the inner diameter to the outer diameter of the magnetic medium surface 52, and may be extrapolated as such. However, in one embodiment a calibration for track-to-track motion can be enhanced by defining a plurality of zones of magnetic bits 101 at various radial distances from the center of the magnetic medium surface 52, as shown in FIG. 10, to be used in connection with track-to-track calibration described in section 2 above. This procedure is challenged by the fact that coarse actuation of the recording head 30 (FIG. 4) must be actively driven at intermediate radial distances to remain on intermediate tracks, which substantially complicates actuation of the micropositioner 40 in aligning the transducer body 42 (FIG. 4). In one embodiment, this challenge is resolved by employing parallel recording heads, wherein one recording head is used to read the intermediate magnetic bits 101, while the other recording head is used to maintain the desired position with respect to coarse actuation.

5. Environmental and In-Use Calibration

Figure 14:
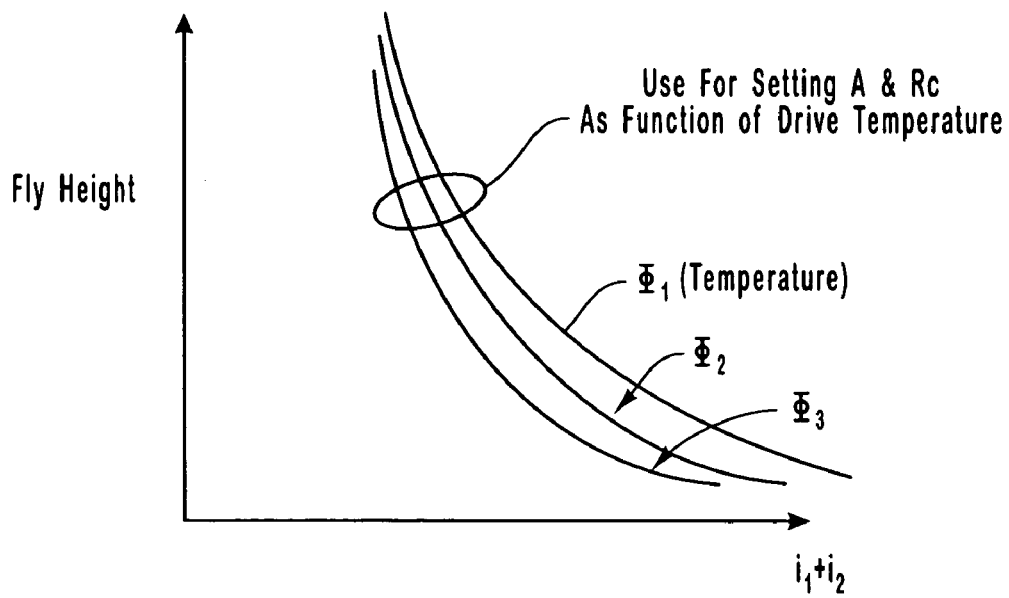
FIG. 14 is a graph showing fly height versus micropositioner current at variant temperatures.
Figure 15:
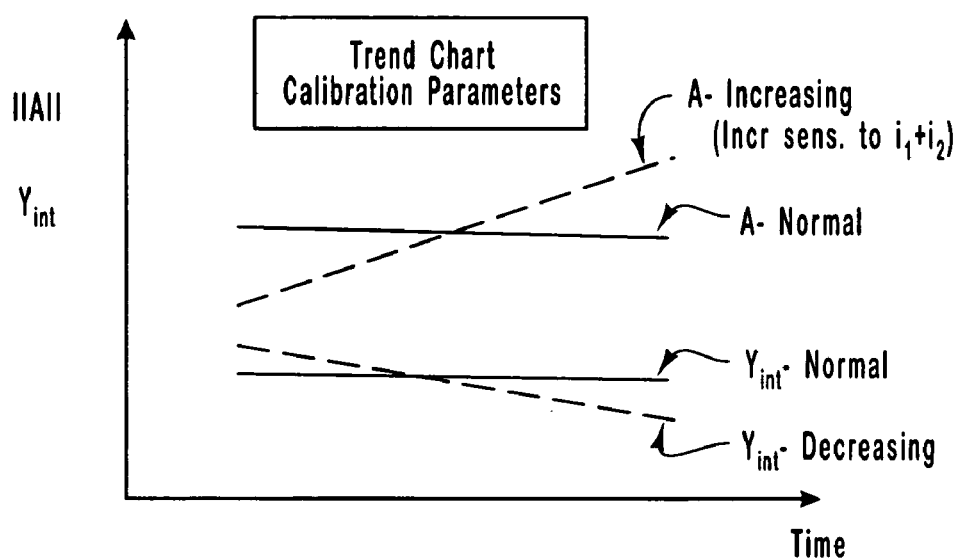
FIG. 15 is a graph showing possible fly height drift over time.

Reference is now made to FIGS. 14 and 15. In one embodiment, the calibration routines described in the above sections can be run in operating environments having multiple temperatures to determine the dependence of a function $f_i$ and A (see equations (2), (4), and (5)) on temperature. Corrections based on either a fit algorithm or a look-up table can then be used to interpolate or extrapolate the correct micropositioner bias based on a given temperature. An example of the resultant data curve from such procedures is shown in FIG. 14.

In another embodiment, the calibration routines described in the above sections can be performed at multiple pressures to determine the dependence off $f_i$ and A on pressure. This can be accomplished by, for example, putting the drives in a pressure chamber. Corrections either based on a fit algorithm or look-up table can then be used to interpolate or extrapolate the correct actuation inputs based on the pressure. Note that both track-to-track and fly height calibrations are only weakly related to pressure, and are not likely to require significant corrections based on pressure, especially given the fact that equation (2) is largely based on transducer resistance.

In one embodiment, periodic recalibrations of fly height and track-to-track motions can be performed during the operational lifetime of the magnetic storage device to ensure that previous factory or other calibrations are accurate in order to continue providing optimum in-service performance over time. These recalibrations can be designed to occur at periods of inactivity, as monitored by a preset algorithm. The readings from each calibration can also be stored in memory to enable subsequent trending and analysis and to predict changes in the mechanical performance, as shown in FIG. 15.

For example, if debris collection inadvertently collects on the recording head, the recording head can be altered in its fly height, thereby causing unintended alterations to fly height characteristics. Given that the micropositioning system utilized in connection with the present invention as disclosed herein can be configured as a self-calibrating device over a range of flying heights, the present invention is substantially more sensitive to changes such as that just described, thereby enabling it to alter its settings to correct any problem conditions and ensure correct fly height and track-to-track operations. Note that this is in direct contrast to known drives, where read-back performance is only monitored, and not controlled.

6. A Sample Algorithm

Once the calibrations described in the previous sections have been completed, the desired fly height and track-track offset can be controlled during normal disc operations. For example, to describe a simple proportional, integral, differential (PID) algorithm, considering only a differential function, the following can be performed:

$$I_{1\ t=1}=(i_1-i_2)_{t=1}=(i_1-i_2)_{t=0}+f^*_1(i_1,i_2)\times(T_A-T_T)+f^*_2(i_1,i_2)\times(R-R_T) \quad (6)$$

$$I_{2\ t=1}=(i_1+i_2)_{t=1}=(i_1+i_2)_{t=0}+f^*_3(i_1,i_2)\times(T_A-T_T)+f^*_4(i_1,i_2)\times(R-R_T), \quad (7)$$

and $$i_{1\ t=1} = (I_1 + I_2)/2 \qquad (8)$$

$$i_{2\ t=1} = (I_1 - I_2)/2, \qquad (9)$$

where $f^*_i$ are inversions of the functions $f_i$ defined earlier, and are functions of absolute settings of $i_1$ and $i_2$, radius and temperature, and $T_A$, $T_T$, R and $R_T$ are the actual and targeted track-to-track and transducer resistance values (for fly height), respectively.

It is appreciated that, in other embodiment, more complex algorithms using the measured and interpolated information could be formed for more accurate fly height spacing and track-to-track positioning control. Also, other, more complex expressions can be used in conjunction with equations 6–9 to include integrated or differentiated motions, if desired.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. In a magnetic storage device, a method of calibrating motion of a transducer in a vertical direction, the transducer being bi-directionally movable with respect to the surface of a rotatable magnetic medium, the method comprising:
   determining an infinite resistance value of a current passed through the transducer at a first vertical position with respect to the magnetic medium surface;
   determining a contact resistance value of the current passed through the transducer at a second vertical position with respect to the magnetic medium surface, the second position corresponding to physical contact between the magnetic medium surface;
   iteratively adjusting the position of the transducer to a position between the first and second vertical positions while causing the transducer to pass over a plurality of ridges defined on the magnetic medium surface and measuring a resistance value of the current passed through the transducer for each iteration; and
   determining the relationship between each vertical position and its corresponding resistance value.

2. A method of calibrating as defined in claim 1, wherein the transducer is located in a transducer body, and wherein the transducer is selectively moved to each vertical position by first and second bias inputs to the transducer body.

3. A method of calibrating as defined in claim 2, wherein the first and second bias inputs are electrical currents.

4. A method of calibrating as defined in claim 2, wherein the first and second bias inputs are electrical voltage signals.

5. A method of calibrating as defined in claim 1, wherein iteratively adjusting the position of the transducer further comprises iteratively adjusting the position of the transducer at least three times after detecting a change in the resistance value during a prior iteration.

6. A method of calibrating as defined in claim 1, wherein the infinite and contact resistance values are measured when the magnetic medium surface is stationary.

7. A method of calibrating as defined in claim 1, wherein the iterative resistance values are measured when the magnetic medium surface is rotating.

8. A method of calibrating as defined in claim 1, wherein the method of calibrating is performed at multiple locations on the magnetic medium surface having different radial distances from the center of the magnetic medium surface.

9. In a magnetic storage device, a method of calibrating motion of a transducer, the transducer being positioned in a transducer body that is bi-directionally movable in vertical and lateral directions with respect to the surface of a rotatable magnetic medium, the method comprising:
   by the transducer body, positioning the transducer at a first vertical position with respect to the magnetic medium surface and determining an infinite resistance value of a current passed through the transducer;
   by the transducer body, contacting the magnetic medium surface with the transducer at a second vertical position and determining a contact resistance value of the current passed through the transducer; and
   iteratively adjusting first and second bias inputs to the transducer body to position the transducer at positions between the first and second vertical positions while causing the transducer to pass over a plurality of ridges defined on the magnetic medium surface and measuring a resistance value of the current passed through the transducer for each iteration.

10. A method of calibrating motion of a transducer as defined in claim 9, further comprising:
    determining the relationship between each vertical position and its corresponding resistance value.

11. A method of calibrating motion of a transducer as defined in claim 10, wherein iteratively adjusting first and second bias inputs further comprises:
    iteratively adjusting the first and second bias inputs, wherein for each iteration the magnitude of the first bias input equals the magnitude of the second bias input, and wherein the sum of the magnitudes of the first and second bias inputs varies with each iteration.

* * * * *